United States Patent [19]

Föhl

[11] 4,144,423
[45] Mar. 13, 1979

[54] LIMIT SWITCH, PARTICULARLY FOR THE USE AS LOCK-SWITCH FOR SAFETY BELTS

[75] Inventor: Artur Föhl, Schorndorf-Haubersbronn, Fed. Rep. of Germany

[73] Assignee: Repa Feinstanzwerk GmbH, Alfdorf, Fed. Rep. of Germany

[21] Appl. No.: 729,149

[22] Filed: Oct. 4, 1976

[30] Foreign Application Priority Data

Jun. 10, 1975 [DE] Fed. Rep. of Germany ....... 2544632

[51] Int. Cl.² ............................................... H01H 3/16
[52] U.S. Cl. ...................... 200/61.58 B; 200/67 AA; 280/744; 307/105 B
[58] Field of Search ........... 200/61.58 B, 276, 67 AA, 200/303; 340/52 E; 307/10 SB; 280/150 SB

[56] References Cited
U.S. PATENT DOCUMENTS 3,242,297  3/1966  Piber .................................... 200/303
4,031,345  6/1977  Garcia ................................. 200/67 A
4,060,878  12/1977 Dyki ................................... 340/52 E Primary Examiner—Samuel W. Engle
Assistant Examiner—Ralph Palo
Attorney, Agent, or Firm—Herbert L. Lerner

[57] ABSTRACT

Limit switch, particularly for use as a lock switch for safety belts, composed of a flat housing, spaced contact elements in the housing, a switching lever formfittingly secured on one side of the housing with the other side free to move, a spring-loaded switch element on the free end of the lever to open and close the contacts, the side wall of the housing acting as a stop to limit movement of the lever, a cover with an opening for the housing, and a tripping pin attached to the lever extending through the opening, which pin is activated by for example closing a seat belt by a sliding tongue inserted in the housing thus moving the switch element to open or close the contacts.

6 Claims, 8 Drawing Figures

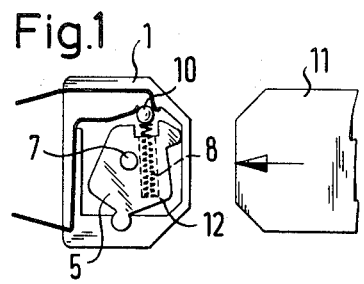
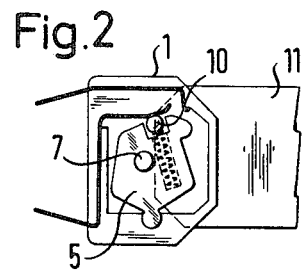
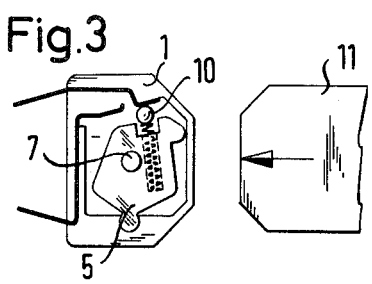
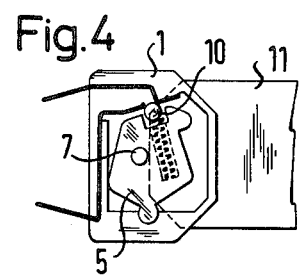
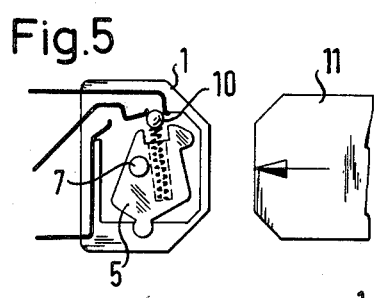
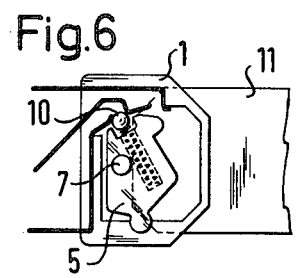
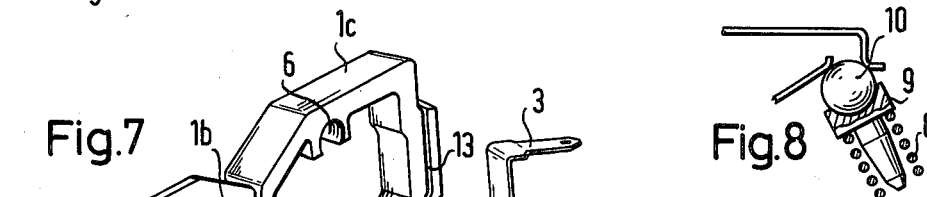
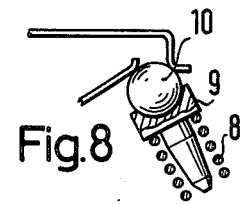

LIMIT SWITCH, PARTICULARLY FOR THE USE AS LOCK-SWITCH FOR SAFETY BELTS

BACKGROUND OF THE INVENTION

1. Field of the Invention

This invention relates to a limit switch of the type that can be installed in locks and closing devices, but can also be applied as safety switch in doors, windows and be incorporated in other openings that are to be closed and more particularly, to a protective switch for safety belts.

2. Description of the Prior Art

As is known, and even mandatory in several countries, when the safety belt is not used i.e. as long as the lock of the safety belt is open, an electric current circuit is triggered, which activates in the vehicle an optical or acoustical signal, and interrupts the ignition circuit, so that starting the car is not possible. A switch for this purpose must not only be relatively inexpensive but ruggedly constructed, because it is required in large quantities, is used frequently and must be effective with little or no service. Thus a protective switch for safety belts must operate with a high degree of reliability because its failure can disable a vehicle and a malfunctioning of the protective switch may diminish the driver's confidence in the safety belt, and incline him unfavorably against using the safety belt.

It was known to provide switches with a spring-loaded rolling contact as an operating member, for example, a ball contact in the form of a ball bearing, whereby the rolling member either slides toward the contact point or away from it.

The use of rolling bodies as an operating contact member in a limit switch is desirable from a technical consideration because such rolling bodies, for example the contact ball, assure good contact even at very low voltages, due to the rolling action during the operation of the switch. Rolling of the roller and rolling it along the surface of the roller, assures the contact areas to be rubbed and thereby cleaned off of possible oxidation coating. Furthermore, the use of a roller-shaped or ball-shaped switching contact member has the advantage that a relatively high contact pressure per unit area is achieved because of the line-shaped seating of the switching member on the contact.

SUMMARY OF THE INVENTION

An object of the invention is to provide an efficient, reliable limit switch, simple in construction, particularly adapted as a protective switch for safety belts.

With the foregoing and other objects in view, there is provided in accordance with the invention a limit switch for installation in locks, closing apparatus and similar devices, particularly for application as lock switch for safety belts including a flat housing, spaced contact elements in the housing which upon closing and opening of the contacts closes and opens a circuit, a switching lever disposed in the flat housing formfittingly secured on one side of the switching lever in a recess of the flat housing with the other end of the switching lever free to move, a spring-loaded switch element disposed on the free end of the switching lever movable to open and close the contacts upon movement of the switching lever, the side wall of the housing acting as a stop to limit the movement of the switching lever, a cover for the housing with an opening in the cover, and a tripping pin attached to the switching lever which extends through the opening in the cover of the housing whereby movement of the tripping pin causes movement of the switching lever and the switching element disposed at the free end of the switching lever to open or close the contacts.

In a preferred embodiment, the limit switch has a spring-loaded switch element, has a spiral spring to furnish switch pressure, and the spiral spring is retained in a recess of the switching lever, and the switch element is seated on a support body with its lower end engaging the inner diameter of the spring, the spring exerting an outward spring force against the support and switch element using its against the contacts and the inner wall of the housing during its movement.

BRIEF DESCRIPTION OF THE DRAWINGS

Other features which are considered as characteristic for the invention are set forth in the appended claims.

Although the invention is illustrated and described herein as embodied in limit switch, particularly for the use as lock-switch for safety belts, it is nevertheless not intended to be limited to the details shown, since various modifications may be made therein without departing from the spirit of the invention and within the scope and range of equivalents of the claims.

The construction and method of operation of the invention, however, together with additional objects and advantages thereof will be best understood from the following description when read in connection with the accompanying drawings, in which:

FIGS. 1 and 2 diagrammatically illustrate the invention for a current holding switch, i.e. a switch which breaks the current by the opening of the contacts when triggered, and FIGS. 3 and 4 diagrammatically illustrate the invention for an open circuit switch, i.e. a switch that triggers the circuit by the closing of the contacts, and FIGS. 5 and 6 diagrammatically illustrate the invention for a double-throw switch, and FIG. 7 is an exploded view of the limit switch in accordance with the present invention, and FIG. 8 is an enlarged view of the free end of the spring with the ball switching member and contacts.

DETAILED DESCRIPTION OF INVENTION

A spring-loaded rolling body, as for example a spring-loaded ball, is used as contact member in the limit switch of the invention. The limit switch is of simple construction employing a switching lever which is formfittingly enclosed in one side of a flat housing. Such an enclosure may take the form of a recess in the housing into which a projection of the switching lever snugly fits, permitting the opposite or free end of the lever to move while the projection acts in the nature of a pivot. The form of the lever is chosen so that the stroke of the switch is limited by the lever hitting one of the side walls of the housing. The lever is also provided with a tripping pin for the sidewise sliding or tripping of the switching lever, whereby the switch member which is disposed on the free end of the switching lever is moved in relation to the contacts in one or the other direction.

In the limit switch intended particularly for use as a protective switch or lock-switch in safety belts, a switching lever is inserted in a housing, which is fabricated as a plastic injection molded part, in one piece with a hinged cover. The switching lever, preferably also made of plastic, has a projection or nose for use as a pivot on one side, which nose is formfittingly engaged in a recess in the housing. The switching lever carriers the switching member on its other side.

In another feature of the invention, it is advantageous to dispose the spiral spring which generates the contact pressure in a longitudinal bore or recess in the switching lever. The switching member, at the end of the spring which extends beyond the switching lever, rests on a reaction body or support member which has a pilot or extension which engages the inside diameter of the spring so that it is secured by the spring force which presses the switching member against the contacts and/or presses against the housing wall. For monostable switches, i.e. switches which always return to a defined starting position when the activating force is removed, the bore or the recess for the switch spring is placed off-center in the switching lever i.e. not directed toward the turning point, and placed on the side in which the switch should remain in the rest position.

In the drawings a so-called lock-switch is shown, i.e. a switch which should indicate if the lock of a safety belt to which the switch is attached, is closed or not, that is if the ends of the belt are joined together or not.

The switch housing is designated by numeral 1 in all the figures of the drawings. In view of the preferred utilization of the switch as a lock-switch for safety belts, the switch housing is placed in fixed connection to one of the parts of the lock of the safety belt. The second part of the safety belt system, namely the sliding tongue enters into the switch and with its leading edge engages tripping pin 7 so that the latter is moved out of its rest position. Thereby, as shall be further explained in the following, ball-shaped switching member 10 is moved by switching lever 5. In the embodiment of FIGS. 1 and 2 (holding current principle), switching member 10 is moved away from the contact point.

In the embodiment of FIGS. 3 and 4 (open circuit principle) switching member 10 is moved toward the contact point. In the embodiment of FIGS. 5 and 6, switching member 10 is moved from one contact place to the other. In the designated embodiments for the various switch types, the switching member is always spring-loaded, i.e. it is pushed by spring pressure onto the contact point, or onto another boundary of the switch. The spiral spring 8 is housed in bore 12, which bore runs off center, i.e. it is directed away from the turning point of the switching lever. This creates in the switching lever a tendency to always tilt toward the right side in good contact with the leading edge of the inserted safety belt. This results in a monostable behavior of the switch, i.e. the switch is always in the starting position as shown in FIG. 1, FIG. 3 and FIG. 5.

At the free end of spring 8 (see FIG. 8) which extends beyond the edge of switch lever 5, the switching member in the form of a ball 10, is fitted into a reaction body or support 9 and held there by spring pressure. This reaction body permits at least to some extent rolling of the switching ball 10 which results in the cleaning effect during the operation of the switch.

In the construction of a switch, as shown in the exploded view of FIG. 7, the complete housing designated by numeral 1 consists of the basic housing 1c, made of injection molded plastic, with the cover 1a molded to it and connected with the basic housing by hinge 1b. The housing cover 1a is provided with a hook-shaped cross-piece 2 which grips over the lower rim of the basic housing 1c. Thus housing 1c is locked by its cover 1a. Cover 1a, in turn, can be readily opened.

The contact pieces 3 and 4 are inserted into the respective channels 13 and 14. The contacts 3 and 4 are formfittingly held in position in basic housing 1c after the closing of cover 1a. Due to the profile of contacts 3 and 4 and channels 13 and 14, and cover 1a, the contacts 3 and 4 are retained in channels 13 and 14 and cannot shift position either lengthwise or sidewise.

Switching lever 5 is secured by means of its pivoting nose 15 closely fitted in recess 6 of the housing 1, permitting the switching lever to move between two stopping points, as can be seen from FIGS. 1 to 4.

Triggering pin 7 is provided for triggering the motion of the switching lever 5. Triggering pin 7 extends through the right opening or bore in the cover 1a when it is closed and functions in conjunction with the sliding tongue 11, i.e. its leading edge or free end, of a safety belt system. The switching lever 5 shows a blind bore 18 which becomes a recess serving to retain the spiral spring 8. The spiral spring 8 acting as a compression spring, carries at its free end, the reaction body 9 which latter has an extension or pilot extending into the inner diameter of the spring 8 as shown in FIG. 8. As mentioned, the bore is arranged off center, in order to effect a monostable switch.

If a bistable switch is required for other purposes, the bore may be directed toward the turning point of the switching lever, so that the switch is stable in both positions. This is illustrated in FIGS. 5 and 6 as a double throw switch. In such instance, only a return motion must be applied to trigger pin 7 which can be accomplished without difficulty if a switch is applied as safety switch on various locking devices of different design.

The triggering pin 7 is positioned approximately in the middle of switching lever 5. An advantageous ratio thereby results between the control path and the contact path, i.e. the distance which the ball travels along the contacts when the switch is operated, is twice as great as the control path, namely the path that the trigger pin 7 must travel.

The exemplified embodiments of the invention are particularly advantageous when applied to a safety belt system. It is feasible to use, as a switching lever, not a body in the form of a pendulum, but to shape the switching lever as a rod and to form the inner walls of the housing so that the required impact points are provided for limiting the stroke of the switch. Also, the arrangement of the contacts, particularly the positioning of the latter to the outside of the housing, can be varied in many ways, for example it can also be combined with a clamp lock.

The configuration of the tripping pin which was directly activated in the exemplified embodiment, can be changed to effect activation by means of auxiliary links, deflection arms, and additional tripping pins.

There are claimed:

1. Limit switch for installation in locks, closing apparatus and similar devices, particularly for application as lock switch for safety belts, comprising
  (a) a flat housing,
  (b) spaced contact elements in said housing which upon closing and opening of said contacts closes and opens a circuit,
  (c) a switching lever disposed in said flat housing form-fittingly secured on one side of said switching lever in a recess of said flat housing with the other end of said switching lever free to move,
  (d) a spring-loaded switch element disposed on the free end of the switching lever movable to open and close said contacts upon movement of said switching lever,
(e) the side wall of said housing acting as a stop to limit the movement of said switching lever,
(f) a cover for said housing with an opening in said cover,
(g) a tripping pin attached to said switching lever which extends through said opening in said cover of the housing, and
(h) a sliding tongue inserted in the housing to move the tripping pin, whereby movement of the tripping pin caused movement of the switching lever and said switching element disposed at the free end of the switching lever to open or close said contacts.

2. Limit switch according to claim 1 wherein said spring-loaded switch element has a spiral spring to furnish switch pressure, and wherein said spiral spring is retained in a recess of said switching lever, and wherein said switch element is seated on a support body with its lower end engaging the inner diameter of said spring, said spring exerting an outward spring force against said support and switch element urging it against the contacts and the inner wall of the housing during its movement.

3. Limit switch according to claim 2, wherein said recess for said spring is disposed off center in the switching lever and on that side in which the switch must remain in the rest position.

4. Limit switch according to claim 1 wherein said contact elements are inserted in channels of the side wall of said housing with the terminals of said contact elements extending outside said housing and said contact elements secured by the closing of said cover without any further fastener.

5. Limit switch according to claim 1 wherein the housing is made as an injection-molded part in one piece and the cover is joined to it by a hinge.

6. Limit switch according to claim 1 for use as lock-switch for safety belts, in which closing of the seat belt by the sliding tongue breaks an electric circuit, wherein said contacts inside said housing are disposed on the side of said housing nearest the entrance of said sliding tongue which effects tripping of said switching lever and closing of the belt.